Patented Mar. 11, 1947

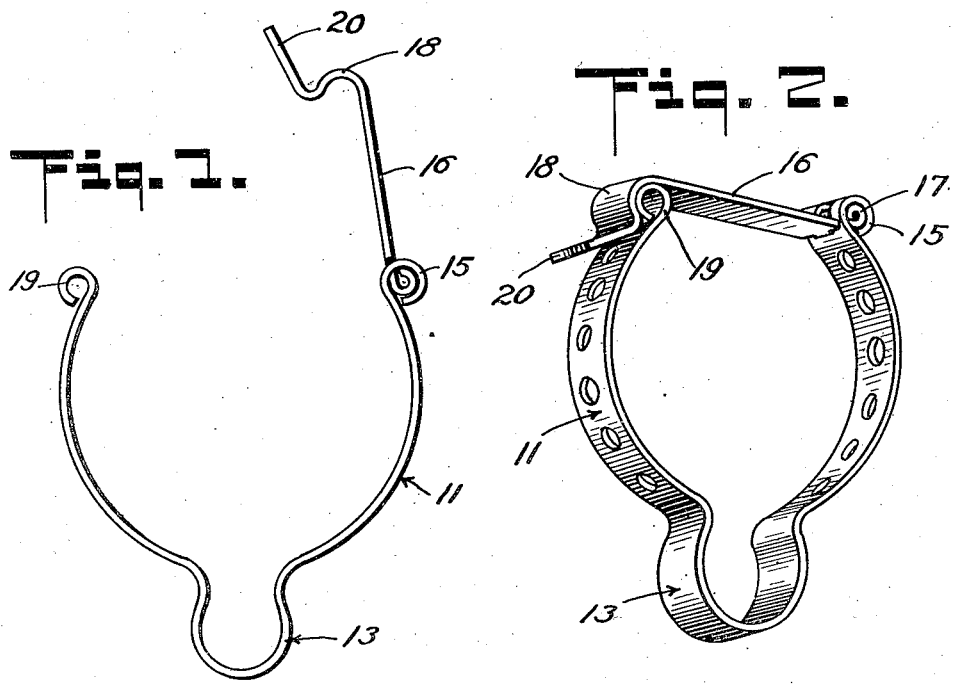
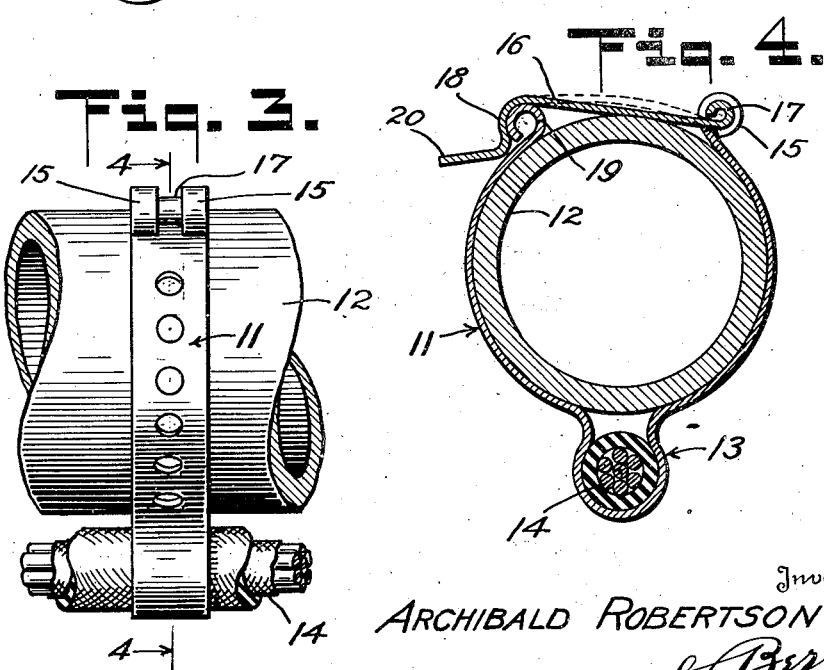

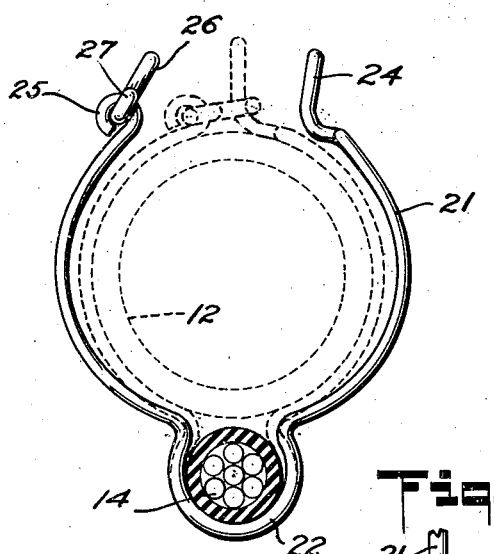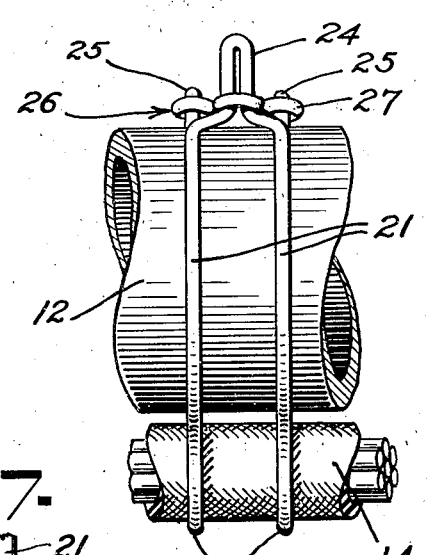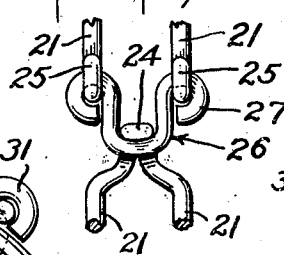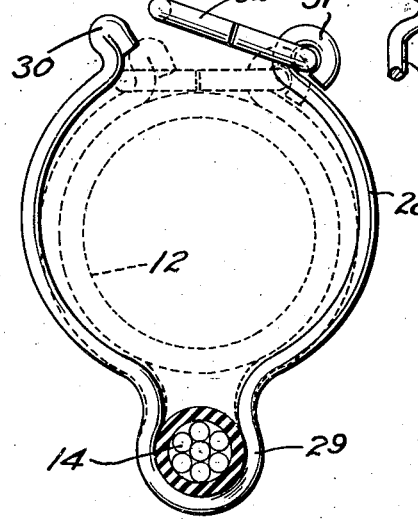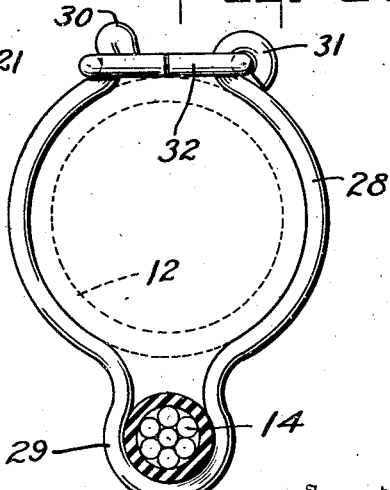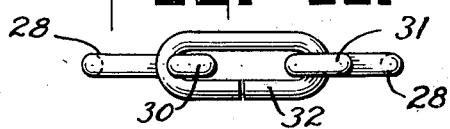

2,417,269

UNITED STATES PATENT OFFICE 2,417,269

CONDUIT-SUPPORTED WIRE CLIP

Archibald Robertson, North Hollywood, Calif., assignor to Adel Precision Products Corp., a corporation of California Application June 12, 1944, Serial No. 539,912

5 Claims. (Cl. 248—61)

This invention relates to wire supporting clips of the type adapted to be mounted on a conduit, pipe or like object for the purpose of supporting a wire or group of wires or a smaller conduit line which is to extend alongside the clip-supporting conduit, as in aircraft where it is the practice to extend conduit line, electrical conductors and other lines alongside one another so that the lighter or smaller lines may be conveniently supported on the larger line between points where the latter are fastened to structural parts of the aircraft.

An object of the present invention is to provide a clip of the character described in which a single strip or length of metal bent to form an open main loop for embracing a conduit or like object so as to be supported thereby, and bent out from said loop to form a smaller loop opening into the main loop for supporting a smaller line such as wires or a conduit, is combined with a fastening member hinged to the main loop for movement into and out of a position for closing and clamping the main loop around the conduit or other object on which the clip is to be supported, whereby the clip may be quickly, easily and securely mounted in place without the use of bolts, nuts and like extraneous fastenings, and as readily removed.

Another object is to provide a clip of the character described which is made of spring metal to insure a tensioned clamping thereof on the supporting conduit and around the wire or line supported thereby whereby through the instrumentality of the hinged fastening member thereof, the clip may be readily installed by hand without the use of tools or extraneous fastenings, to reliably hold the wire or other line against derangement from the desired supported position and protected against wear and damage.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is an end elevation of a clip embodying my invention;

Fig. 2 is a perspective view of the clip shown in Fig. 1;

Fig. 3 is a side elevation of the clip as installed;

Fig. 4 is a sectional view taken on the line 4—4 of Fig. 3;

Fig. 5 is an end elevation of a modified form of the invention;

Fig. 6 is a side elevation of the clip shown in Fig. 5 as it would appear when installed;

Fig. 7 is a fragmentary top plan view of the fastening or hook means embodied in the clip shown in Figs. 5 and 6;

Fig. 8 is an end elevation of another modified form of clip;

Fig. 9 is an end elevation of the clip shown in Fig. 8 as when installed;

Fig. 10 is a fragmentary top plan view of the fastening means embodied in the clip of Figs. 8 and 9.

Referring to the drawing more specifically it is seen that one embodiment of my invention comprises a clip made of a spring metal strap bent to form an open main loop 11 adapted to embrace a conduit 12 as shown in Figs. 3 and 4 and further bent to form a smaller loop 13 which opens directly into the main loop for supporting a wire 14 or a small conduit or other line, not shown, so that the wire or line will extend alongside the conduit as shown in Fig. 3. The smaller loop 13 is formed at a point between and preferably centrally of the free ends of the main loop 11. One of the free ends of the main loop is bifurcated and rolled back on itself to form a hinge barrel 15 for hingedly connecting thereto a fastening member 16 in the form of a hook. This hook is formed with a similar barrel 17 mounted to turn in the barrel 15 whereby the bill 18 of the hook may be hooked over a barrel 19 formed by bending back on itself the other free end of the main loop, to close the main loop and clamp it around the conduit as shown in Fig. 4. A lip 20 projecting from the bill of the hook 16 serves as guide in interlocking the ends of the main loop and as a finger piece to be lifted upward to disengage the hook.

With reference to Fig. 1 it is seen that the main loop is normally U-shaped and fully open so that the wire 14 may be readily mounted in the small loop 13 and the main loop then placed on the conduit, after which the ends of the loop are forced together so that the barrel 19 will be engaged in the bill of the hook, or the hook manipulated to hook over said barrel. Due to the tension of the main loop it is seen that the hook and barrel will snap into hooked relation and be so maintained under tension whether the two ends are hooked together by forcing the hook downwardly to snap over the barrel 19 or the latter is pressed under the lip 20 and into the bill of the hook. When the hook 16 is in hooked position it constricts the loop and places it under tension throughout, also the small loop 13 thereby effectively clamping the main loop on the conduit 12 as well as clamping the small loop around the wire 14 therein to securely hold the wire in place.

The hook 16 is made of a piece of strap metal corresponding to the strap for forming the two loops and is in effect a section of the main loop in that when in hooked position forms a conduit encircling band or loop conforming closely to the conduit as shown in Fig. 4.

While the hook as shown in full lines in Fig. 4 will contact the conduit, it may, as indicated in dotted lines, be bent so as to avoid contact with the conduit as may be preferable in some instances.

As shown in Figs. 5, 6 and 7, I may form the clip of a spring wire bent to form two parallel main loops 21 and two smaller loops 22 arranged in the same manner as loops 11 and 13 in Figs. 1 to 4 and for the same purposes. The doubled end of the wire is bent to form an outward projection 24 whereas the free ends of the wire are bent back on themselves to form a pair of eyes 25. The projection 24 and eyes 25 comprise the spaced apart ends of the main loops which is therefore open for reception of the conduit 12 in the same manner as the loop 11.

A fastening member or hook 26 of a U-shape and made of wire is hinged to the main loops by interlocking the eyes 27 on the hook with the eyes 25 on the loop as shown in Fig. 7.

The ends of the main loops 21 are forced together and the hook 26 is hooked over the projection 24 to hold the main loops clamped around the conduit so that the wire 14 will be supported in the smaller loops 22.

Another modified form of my invention as shown in Figs. 8 to 10 is made of a single and somewhat heavier piece of wire bent to form a main loop 28 and a smaller loop 29 opening into the main loop in the same manner as in the other forms of my invention.

One end of the main loop is doubled and bent outward as a hook-like projection 30 whereas the other end of the main loop is formed into an eye 31 for hingedly connecting a fastening or hook member 32 to the main loop. This fastening or hook member is in the form of an elongated link made of wire and adapted to be hooked over the projection 30 to close the main loop and clamp it on the conduit so that the wire in the small loop 29 will be supported in the desired position as shown in Fig. 9.

In both embodiments of the invention each side portion of the smaller loop is formed by an outcurved section of the strap and this out-curved part blends at each side directly into an in-curved strip section whereby the supporting neck is narrowed to less than the diameter of the smaller loop and whereby said smaller loop is united to the main loop in such a manner that the supported wire 14, even though it completely fills said smaller loop, will have its upper side slightly spaced away from the large conduit 12. This spacing of the wire 14 from the supporting conduit prevents vibration from rubbing the wire injuriously against said conduit.

It is now seen that each of the clips embodying the present invention as here shown is characterized by a hinged fastening member which constitutes a section of the main loop and provides for a quick and easy clamping of the clip on a conduit or the like without the use of extraneous fastenings, whereby a wire or line may be supported in the small loop in the desired relation to the conduit, it being possible to as readily and easily remove the clip.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a clip for supporting a wire so as to extend adjacent a conduit or the like on which the clip is to be mounted, a conduit-embracing loop having spaced end portions adapted to be brought toward one another to clamp the loop around the conduit, an open wire-embracing loop formed of a part of the material of the conduit-embracing loop and opening into the latter at a point farthest removed from said end portions, and a hook member having a substantially straight shank hingedly connected to one of said end portions for movement of the hook member into and out of position to hook said end portions together to close the conduit embracing loop and clamp it around the conduit.

2. In a clip, a spring metal open loop having spaced apart ends adapted to be forced toward one another to clamp the loop around a conduit or like member, a fastening member having a straight shank hinged to one of said ends and movable into and out of position such that said fastening member will contact the other of said ends so as to constrict and clamp the loop around the conduit or like member with said shank contacting the conduit, and a second open loop formed integral with the first loop for supporting an object therein and opening directly into the first loop at a point farthest removed from the ends of the latter so as to receive the object after the object has been passed through the first loop.

3. In a clip, a length of spring wire bent to form a pair of main open loops extending side by side and further bent to form a pair of open loops which project outwardly from and open into the main loops at points farthest removed from the open sides of the main loops, eyes formed at ends of the main loops, an outward projection at the other ends of the main loops, and a hook member hinged to said eyes and adapted to hook over said projection.

4. In a clip, a length of spring wire bent to form a pair of main open loops extending side by side and further bent to form a pair of open loops which project outwardly from and open into the main loops at points farthest removed from the open sides of the main loops, eyes formed at ends of the main loops, an outward projection at the other ends of the main loops, said outward projection being formed by doubling back upon itself an end portion of the main loop of which it forms a part, and a hook member hinged to said eyes and adapted to hook over said projection.

5. In a clip, a spring metal strip comprising a main open loop having spaced apart ends adapted to be forced toward one another to clamp the loop around a conduit or like member, a fastening member fastened to one of said ends and movable into and out of position to contact the other of said ends so as to constrict and clamp the loop around the conduit or like member, and a smaller loop projecting outwardly from that side of said main loop which is farthest from said fastening member, said smaller loop having each of its side portions united in an unbroken manner with the metal strip which forms said main loop, each side portion of said smaller loop being united to the main loop by an out-curved section of the metal strip, this out-curved part blending directly into an in-curved strip section, thus uniting the two loops by a neck which is of less width than the diameter of the smaller loop and thus positioning the smaller loop adjacent to the main loop while maintaining a slight space between the inner peripheries of the two loops so that tubular objects filling each of them will not contact with each other.

ARCHIBALD ROBERTSON.

REFERENCES CITED

The following references are of record in the file of this patent:

UNITED STATES PATENTS

| Number | Name | Date |
|---|---|---|
| 1,379,476 | Parr | May 24, 1921 |
| 1,640,521 | Wheeler | Aug. 30, 1927 |
| 2,303,108 | Blackburn | Nov. 24, 1942 |
| 1,164,613 | Jewell | Dec. 14, 1915 |
| 355,493 | Wiley | Jan. 4, 1887 |
| 934,804 | Folger | Sept. 21, 1909 |
| 654,983 | Hyde | July 31, 1900 |